(No Model.)
A. SCHAER.
CLOTH AND YARN CALCULATING RULE.
No. 543,899. Patented Aug. 6, 1895.
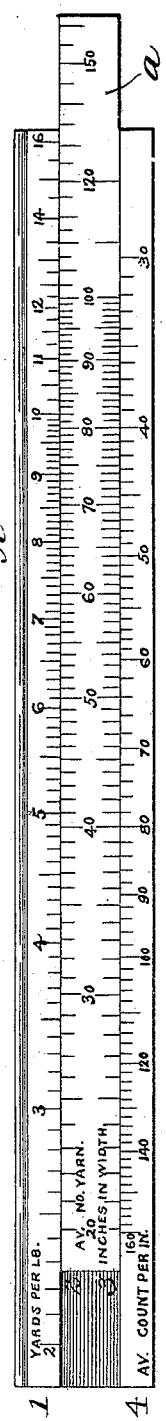
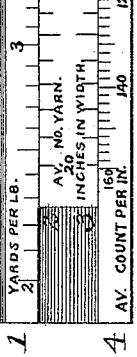
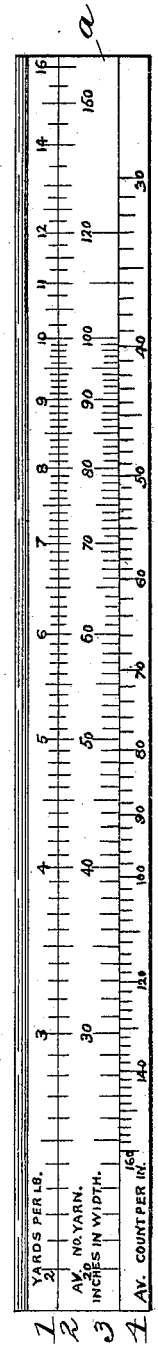
WITNESSES. INVENTOR.
Charles Hannigan. Arnold Scharr.
L. J. Bush. by Benj. Arnold
Atty.

UNITED STATES PATENT OFFICE.

ARNOLD SCHAER, OF WARREN, RHODE ISLAND.

CLOTH AND YARN CALCULATING RULE.

SPECIFICATION forming part of Letters Patent No. 543,899, dated August 6, 1895.

Application filed March 30, 1895. Serial No. 543,835. (No model.)

*To all whom it may concern:*

Be it known that I, ARNOLD SCHAER, of Warren, in the county of Bristol and State of Rhode Island, have invented certain new and useful Improvements in Cloth and Yarn Calculating Rules; and I do hereby declare that the following is a full, clear, and exact description thereof, reference being had to the accompanying drawings, and to the letters of reference marked thereon, which form a part of this specification.

This invention relates to the class of computing devices for solving arithmetical questions. Its object is to provide mechanical means for solving certain questions that arise in manufacturing textile fabrics that solved in the usual way require a great deal of figuring and calculation on the part of both the manufacturer and the dealer. One of these questions, for instance, is, if a dealer wants cloth of a certain width and number of yards to the pound, what number of yarn and how many picks to the inch in weaving will make the goods? Another question is, having goods of a certain width and number of yards to the pound and number of picks to the inch, what is the number of the yarn? And having yarn of a certain number, what must be the number of picks per inch to make goods of a certain width and weight? These and many like questions that usually require elaborate calculations, with all their liability to error, are correctly solved with a single movement of the device which is the subject of this invention. It is fully explained and illustrated in this specification and accompanying drawings.

Figure 1 shows a top view of the calculating-rule closed. Fig. 2 represents the same open, as when it is in use. Fig. 3 is a cross-section or end view.

This calculating device consists of a rule A, of any convenient length, having a dovetailed groove made in the center of its width and extending the whole length of the rule. A strip $a$ is fitted to slide in the groove after the manner of slide-rules. This rule then has four lines of divisions made on it, designated as 1 2 3 4 in the drawings. Lines 1 and 4 are made on the rule proper at each side of the groove, and lines 2 and 3 are made on the slide $a$. The space made by the divisions on the lines 1 2 3 commence largest at the left hand and decrease in logarithmic proportion as they go to the right, and when the slide $a$ is closed in the rule the divisions on the lines 1 2 3 exactly agree with each other, though line 1 is numbered 2 3 4, while the same divisions on the slide $a$ are marked 20 30 40, and so on, the figures in the middle of the slide serving for lines 2 and 3 on each side of them. The line 4 of divisions are also made in logarithmic proportion, but increase in the opposite direction to the other lines, and when the slide $a$ is close in No. 40 on the slide is opposite No. 99 on line 4. Line 1 of the divisions is marked on the rule as "No. of yards per lb.," and line 2 is marked on the slide "Av. No. of yarn." Line 3 is also marked on the slide as "Inches wide," and line 4 is designated on the rule as "Av. count," (or average picks per inch,) which means that as the number of picks per inch of the filling may not be the same as the number of threads per inch of the warp the average of the two is taken as the average count. If the one was eighty threads to the inch and the other eighty-six threads, eighty-three would be average count. The same remark applies to the "Av. No. of yarn" marked on line 2 of the divisions.

To use the rule to solve the following questions: If the cloth is forty inches wide and the average count per inch eighty, move the slide $a$ so that 40 on the line 3 is opposite to 80 on line 4, and opposite to the number of yarn on line 2 will be the number of yards per pound the cloth will be. If the yarn is No. 30, cloth will weigh three and seven-tenths yards per pound. If the yarn is No. 60, the cloth will run seven and four-tenths yards per pound. And the reverse process is also correct. If the cloth weighs four and nine-tenths yards per pound and the yarn is No. 40, bring $4\frac{9}{10}$ on line 1 opposite 40 on line 2, and opposite any width of cloth on line 3 will be found on line 4 the number of count per inch necessary to make the goods. If the count is 100 per inch on line 4, the width will be thirty-two inches on line 3. If the count is 75, the width will be forty-nine inches. And if the number of the yarn is 80 on line 2 and the count is 60 on line 4 and they are placed opposite each other, then opposite any width on line 3 is the number of yards per pound on line 1. These examples are but few of the many in which by the use of the rule calculations can be quickly made that comparatively few are qualified to make in the usual way because of the number of factors and their relations to each other.

Having thus described my improvement, I claim as my invention and desire to secure by Letters Patent—

1. A rule for use in calculating the relative size and weight of yarn and cloth, having a sliding portion in it marked with two rows of divisions increasing in logarithmic proportion to each other, from one end, a row of divisions on the rule to one side of the slide, agreeing with the divisions on the slide, and having a row of divisions increasing in logarithmic proportion to each other from the other end of the rule, substantially as described.

2. A rule for use in calculating the relative size and weight of yarn and cloth having a sliding portion in it marked with two rows of divisions increasing in logarithmic proportion to each other, from one end, the upper row being marked "Av. No. of yarn" and the lower row marked "No. inches in width," a row of divisions on the rule to one side of the slide, agreeing with the divisions on the slide and marked "No. of yards per lb.," a row of divisions increasing in logarithmic proportion to each other from the other end of the rule and marked "Av. count," substantially as described.

3. In a calculating rule the combination of three lines of divisions exactly agreeing with each other and increasing in logarithmic proportion to each other from one end of the rule, two of said lines being made on a slide movable on said rule, and the other line of the three made on the rule to one side of the slide, with a fourth line of divisions of like proportions to each other but made in reversed order on the rule to the three first lines of divisions, substantially as described.

ARNOLD SCHAER.

Witnesses:
BENJ. ARNOLD,
JAMES E. ARNOLD.